US008917402B2

(12) United States Patent
Baba (10) Patent No.: US 8,917,402 B2
(45) Date of Patent: Dec. 23, 2014

(54) POWER-SUPPLY CONTROL DEVICE, IMAGE PROCESSING APPARATUS, NON-TRANSITORY COMPUTER READABLE MEDIUM, AND POWER-SUPPLY CONTROL METHOD FOR CONTROLLING POWER-SUPPLY BASED ON MONITORING A MOVEMENT AND EXECUTING AN INDIVIDUAL RECOGNITION (71) Applicant: Fuji Xerox Co., Ltd., Minato-ku, Tokyo (JP)

(72) Inventor: Motofumi Baba, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/906,794

(22) Filed: May 31, 2013

(65) Prior Publication Data
US 2014/0104631 A1 Apr. 17, 2014

(30) Foreign Application Priority Data

Oct. 15, 2012 (JP) .................................. 2012-228342

(51) Int. Cl.
*H04N 1/00* (2006.01)
*G06K 9/00* (2006.01)
(52) U.S. Cl.
CPC .............. *H04N 1/00888* (2013.01); *G06K 9/00* (2013.01); *H04N 1/00323* (2013.01); *H04N 1/00336* (2013.01); *H04N 1/00891* (2013.01); *H04N 1/00904* (2013.01); *H04N 2201/0094* (2013.01)
USPC ....................................................... 358/1.13
(58) Field of Classification Search
USPC ....................................................... 358/1.13
See application file for complete search history.

(56) References Cited

U.S. PATENT DOCUMENTS

2004/0129883 A1* 7/2004 Dougherty et al. ........ 250/338.3

FOREIGN PATENT DOCUMENTS

| JP | 05-045471 A | 2/1993 |
| JP | 2002-015367 A | 1/2002 |
| JP | 2004-331051 A | 11/2004 |
| JP | 2007-279603 A | 10/2007 |
| JP | 2010-135993 A | 6/2010 |
| JP | 2010-157789 A | 7/2010 |

OTHER PUBLICATIONS

Machine translation for JP 2010-157789, IDS.*
Machine translation for JP 2007-279603, IDS.*

* cited by examiner

*Primary Examiner* — Qian Yang
(74) *Attorney, Agent, or Firm* — Sughrue Mion, PLLC (57) ABSTRACT A power-supply control device includes a changing unit, a monitoring unit, a commanding unit, an imaging unit, and an individual recognition unit. The changing unit changes an operation mode of a controlled subject to a power supply mode or a power cutoff mode. The monitoring unit monitors a movement of a moving body during the power cutoff mode. The commanding unit outputs a command for changing the operation mode of the controlled subject to the power supply mode if the monitoring unit determines that the moving body is approaching the controlled subject. The imaging unit is supplied with electric power in response to the approaching of the moving body and captures a characteristic image of the moving body. The individual recognition unit executes an individual recognition process based on image information of the characteristic image captured by the imaging unit.

6 Claims, 8 Drawing Sheets

La (SUPPLYING ELECTRIC POWER BUT NO IMAGING)

FIG. 8C

La (SUPPLYING ELECTRIC POWER AND PERFORMING IMAGING)

US 8,917,402 B2

POWER-SUPPLY CONTROL DEVICE, IMAGE PROCESSING APPARATUS, NON-TRANSITORY COMPUTER READABLE MEDIUM, AND POWER-SUPPLY CONTROL METHOD FOR CONTROLLING POWER-SUPPLY BASED ON MONITORING A MOVEMENT AND EXECUTING AN INDIVIDUAL RECOGNITION

CROSS-REFERENCE TO RELATED APPLICATIONS

This application is based on and claims priority under 35 USC 119 from Japanese Patent Application No. 2012-228342 filed Oct. 15, 2012.

BACKGROUND

Technical Field

The present invention relates to power-supply control devices, image processing apparatuses, non-transitory computer readable media, and power-supply control methods.

SUMMARY

According to an aspect of the invention, there is provided a power-supply control device including a changing unit, a monitoring unit, a commanding unit, an imaging unit, and an individual recognition unit. The changing unit changes an operation mode of a controlled subject to a power supply mode or a power cutoff mode. The monitoring unit monitors a movement of a moving body during the power cutoff mode. The commanding unit outputs a command for changing the operation mode of the controlled subject to the power supply mode if the monitoring unit determines that the moving body is approaching the controlled subject. The imaging unit is supplied with electric power in response to the approaching of the moving body and captures a characteristic image of the moving body. The individual recognition unit executes an individual recognition process based on image information of the characteristic image captured by the imaging unit.

BRIEF DESCRIPTION OF THE DRAWINGS

An exemplary embodiment of the present invention will be described in detail based on the following figures, wherein.

DETAILED DESCRIPTION

Configuration of Image Processing Apparatus

Figure 1:
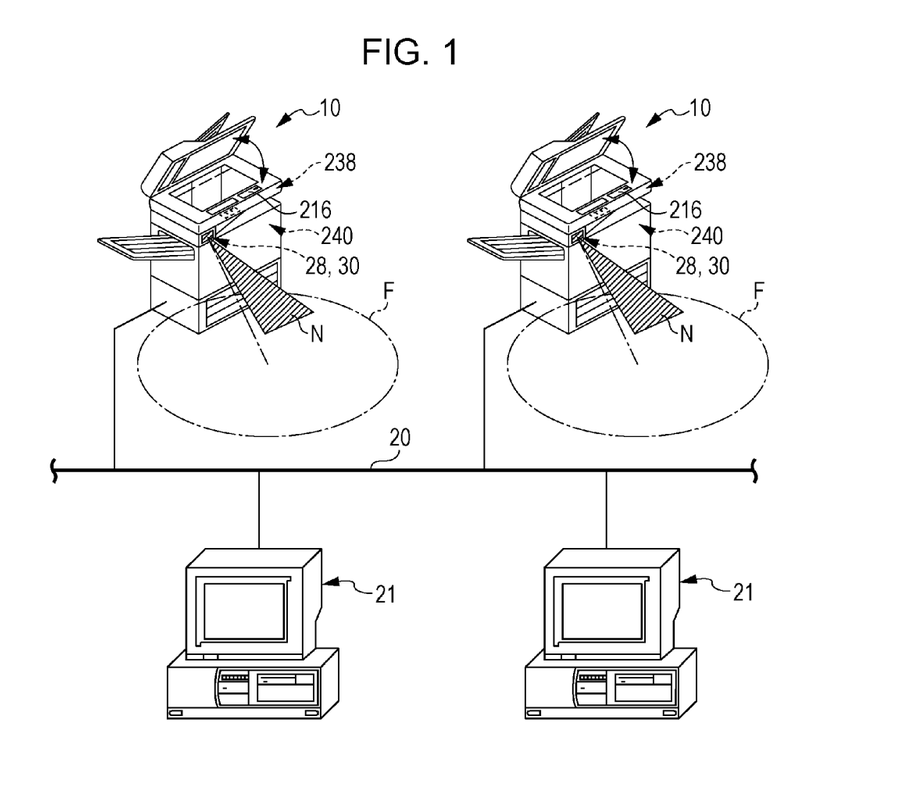
FIG. 1 illustrates a communication network including image processing apparatuses according to an exemplary embodiment.

As shown in FIG. 1, image processing apparatuses 10 according to an exemplary embodiment are connected to a communication network 20, such as the Internet. Although two image processing apparatuses 10 are connected in FIG. 1, the number thereof is not limited and may be one or three or more.

The communication network 20 is connected to multiple personal computers (PCs) 21 as information terminal apparatuses. Although two PCs 21 are connected in FIG. 1, the number thereof is not limited and may be one or three or more. The information terminal apparatuses are not limited to PCs 21 and do not necessarily have to be wired-connected to each other. In other words, a communication network through which information is wirelessly exchangeable is also permissible.

As shown in FIG. 1, with regard to each image processing apparatus 10, there is a case where an image formation (print) command is input remotely from one of the PCs 21 to the image processing apparatus 10 by, for example, transferring data thereto, or a case where a user standing in front of the image processing apparatus 10 operates the image processing apparatus 10 so as to command the image processing apparatus 10 to execute, for example, a copy, scan, or facsimile send-receive process.

Figure 2:
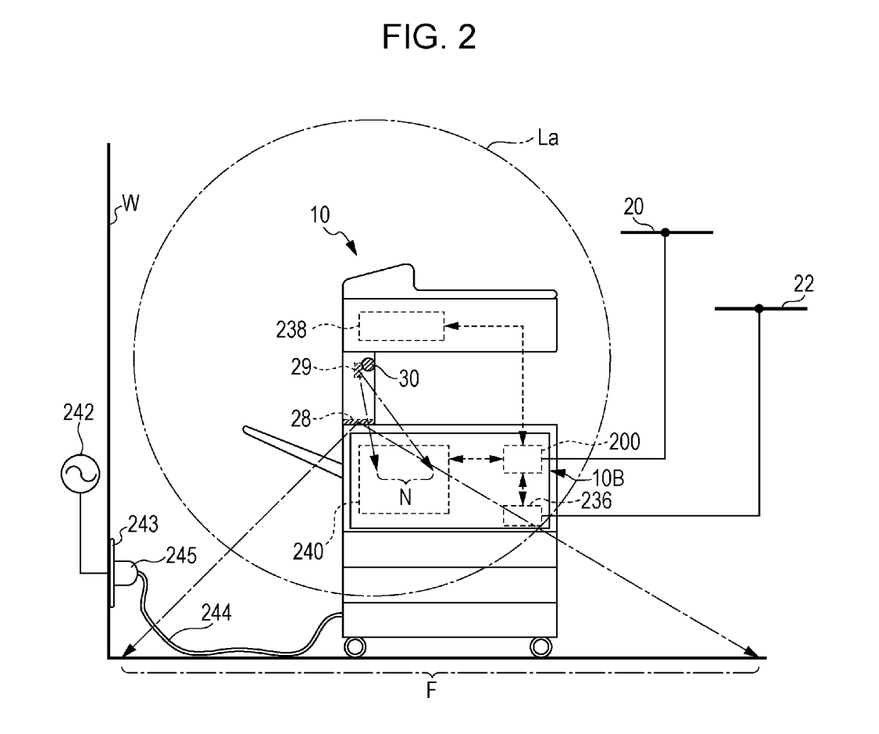
FIG. 2 schematically illustrates one of the image processing apparatuses according to the exemplary embodiment.

FIG. 2 illustrates one of the image processing apparatuses 10 according to the exemplary embodiment.

Each image processing apparatus 10 includes an image forming unit 240 that forms an image on recording paper, an image reading unit 238 that reads a document image, and a facsimile communication control circuit 236. The image processing apparatus 10 includes a controller 200 that controls the image forming unit 240, the image reading unit 238, and the facsimile communication control circuit 236 so as to temporarily store image data of the document image read by the image reading unit 238 or transmit the read image data to the image forming unit 240 or the facsimile communication control circuit 236.

The controller 200 is connected to the communication network 20, such as the Internet, and the facsimile communication control circuit 236 is connected to a telephone network 22. For example, the controller 200 is connected to a host computer via the communication network 20 and has a function of receiving image data, as well as sending and receiving a facsimile via the facsimile communication control circuit 236 by using the telephone network 22.

The image reading unit 238 is provided with a document tray on which a document is placed, a scan drive system that radiates light to the document placed on the document tray while scanning an image of the document, and a photoelectric conversion element, such as a charge coupled device (CCD), which receives reflected or transmitted light generated as the result of the scan performed by the scan drive system and converts the light into an electric signal.

The image forming unit 240 includes a photoconductor. The photoconductor is surrounded by a charging device that uniformly charges the photoconductor, a scan exposure section that scans a light beam across the photoconductor on the basis of the image data, an image developing section that develops an electrostatic latent image formed on the photoconductor as the result of the scan exposure process performed by the scan exposure section, a transfer section that transfers the developed image on the photoconductor to recording paper, and a cleaning section that cleans the surface of the photoconductor after the transfer process. Furthermore, a fixing section that fixes the transferred image onto the recording paper is provided on a transport path of the recording paper.

The image processing apparatus 10 has a power plug 245 attached to an end of an input power cable 244 thereof. By plugging the power plug 245 into a power socket 243 of a commercial power source 242 wired to a wall surface W, the image processing apparatus 10 is supplied with electric power from the commercial power source 242.

Hardware Configuration of Control System of Image Processing Apparatus

Figure 3:
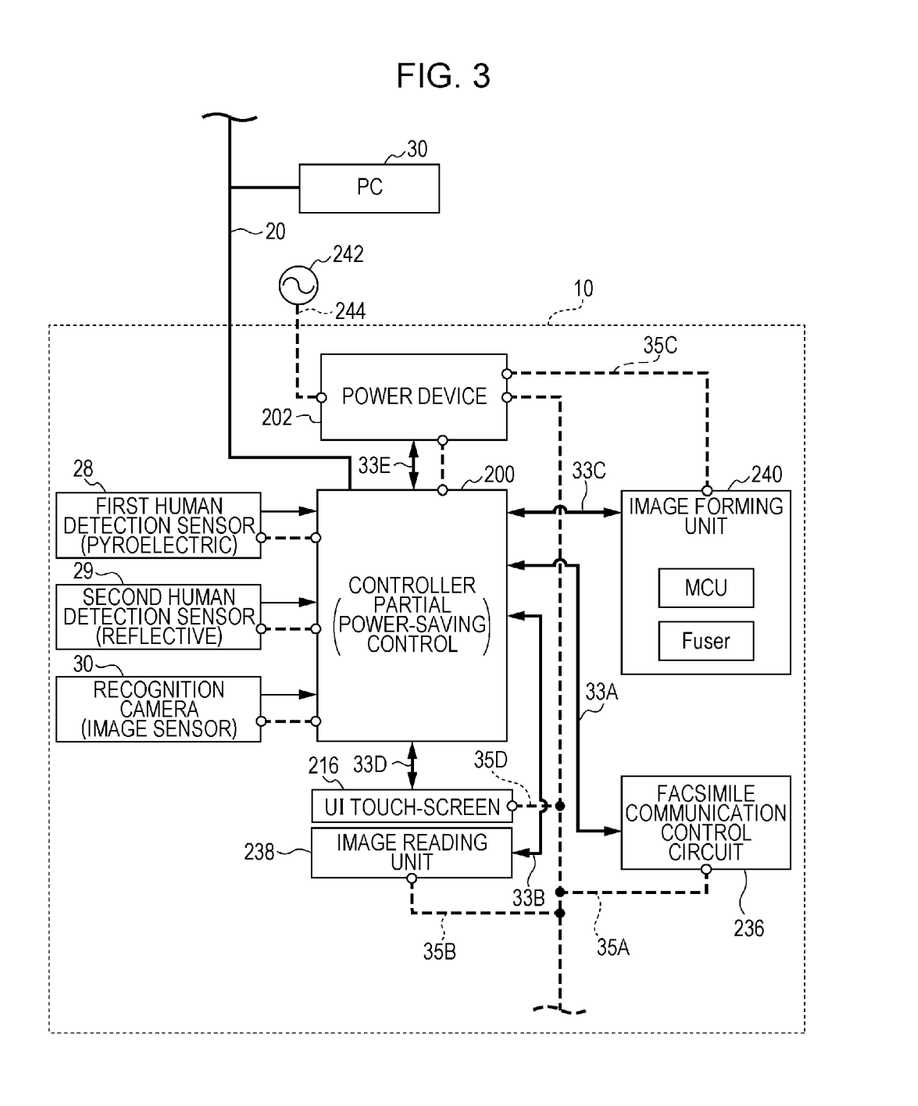
FIG. 3 is a block diagram illustrating the configuration of a control system in the image processing apparatus according to the exemplary embodiment.

FIG. 3 schematically illustrates a hardware configuration of a control system of each image processing apparatus 10.

The communication network 20 is connected to the controller 200. The controller 200 is connected to the facsimile communication control circuit 236, the image reading unit 238, the image forming unit 240, and a user-interface (UI) touch-screen 216 via buses 33A to 33D, such as data buses and control buses. Specifically, the controller 200 controls each processing unit in the image processing apparatus 10. A UI-touch-screen backlight 216BL (see FIG. 4) is attached to the UI touch-screen 216.

The image processing apparatus 10 further includes a power device 202 that is connected to the controller 200 via a signal harness 33E.

The power device 202 is supplied with electric power from the commercial power source 242 via the input power cable 244.

The power device 202 is provided with power supply lines 35A to 35D for supplying electric power independently to the controller 200, the facsimile communication control circuit 236, the image reading unit 238, the image forming unit 240, and the UI touch-screen 216, respectively. Therefore, the controller 200 is capable of performing so-called partial power-saving control for supplying power (i.e., a power supply mode) or cutting off the power supply (i.e., a sleep mode) to the individual processing units (devices).

Furthermore, the controller 200 is connected to multiple sensors (i.e., a first sensor 28, a second sensor 29, and a third sensor 30) that monitor the presence of people around the image processing apparatus 10. The first sensor 28, the second sensor 29, and the third sensor 30 will be described later.

Functional Block Diagram of Partial Power-Saving Configuration

Figure 4:
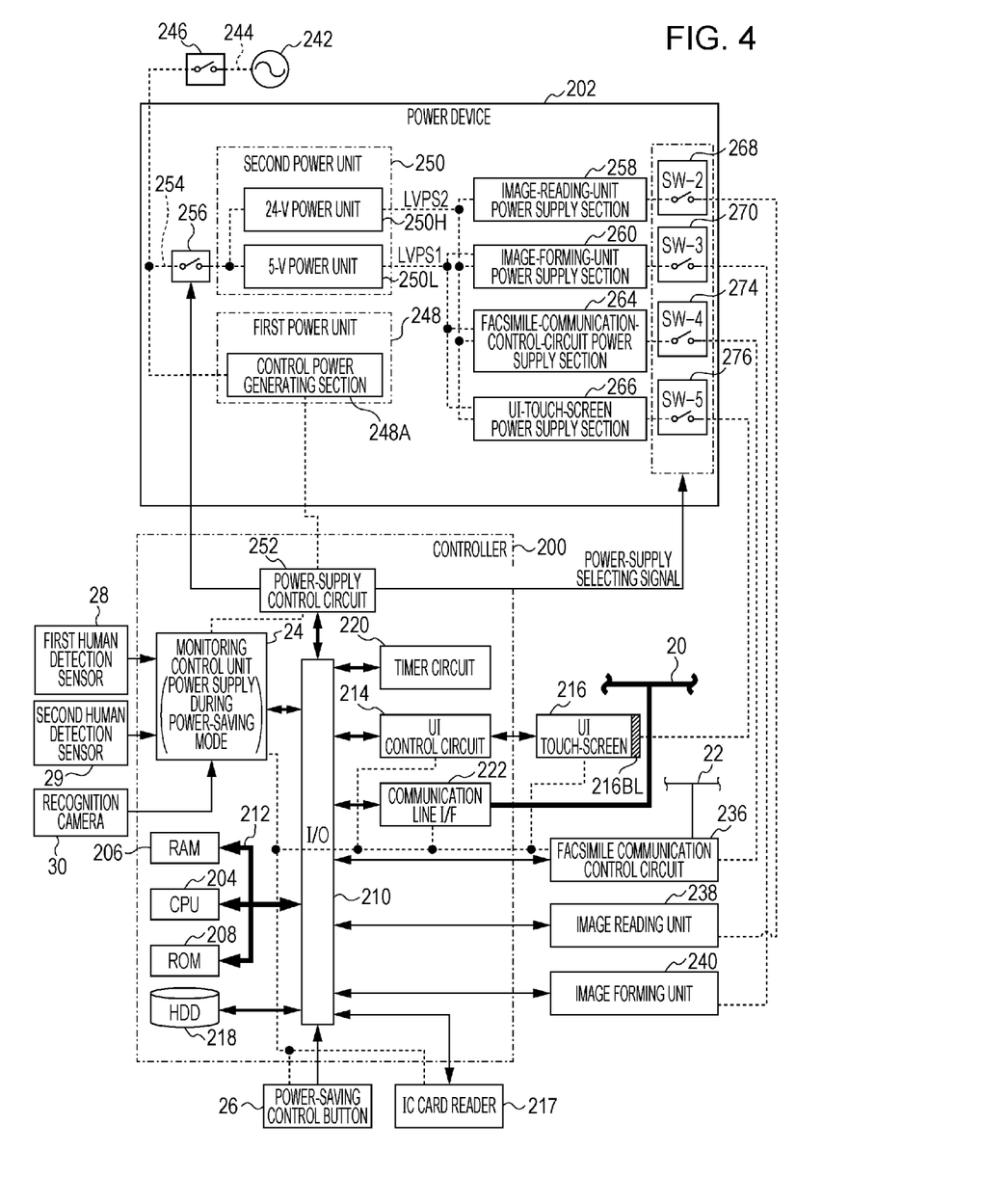
FIG. 4 schematically illustrates a control system of a controller and a power device according to the exemplary embodiment on a function-by-function basis.

FIG. 4 schematically illustrates a configuration including processing units (sometimes referred to as "loads", "devices", "modules", etc.) that serve as controlled subjects to be controlled by the controller 200 and are operable by receiving electric power, the controller 200, and power lines of the power device 202 for supplying electric power to the individual devices. In the exemplary embodiment, the image processing apparatus 10 is capable of supplying or not supplying electric power to the processing units on a unit-by-unit basis (partial power-saving control). The partial power-saving control performed on the processing units on a unit-by-unit basis is only an example. Alternatively, the partial power-saving control may be performed on a group-by-group basis by dividing the processing units into groups.

The controller 200 is included as one of subjects for partial power-saving. If all of the processing units are to be controlled for partial power-saving, a monitoring control unit 24 (to be described later) receives minimal electric power and cuts off the power supply to other control devices (this mode may sometimes be referred to as "power-saving mode" or "sleep mode").

Controller 200

As shown in FIG. 4, the controller 200 includes a central processing unit (CPU) 204, a random access memory (RAM) 206, a read-only memory (ROM) 208, an input-output (I/O) unit 210, and buses 212, such as data buses and control buses, which connect these components to each other. The I/O unit 210 is connected to the UI touch-screen 216 (including the backlight 216BL) via a UI control circuit 214. Moreover, the I/O unit 210 is connected to a hard disk drive (HDD) 218. The CPU 204 operates based on a program stored in the ROM 208, the HDD 218, or the like so that the function of the controller 200 is achieved. Alternatively, the CPU 204 may operate based on a program installed from a recording medium (such as a compact disc (CD), a digital versatile disc (DVD), a Blu-ray Disc (BD), a universal-serial-bus (USB) flash memory, a secure digital (SD) memory card) so that an image processing function is achieved.

The I/O unit 210 is connected to a timer circuit 220 and a communication line interface (I/F) 222. Furthermore, the I/O unit 210 is also connected to devices such as the facsimile communication control circuit 236 (i.e., a modem), the image reading unit 238, and the image forming unit 240.

The timer circuit 220 performs time-keeping (sometimes referred to as "system timer" hereinafter) for determining when to set the facsimile communication control circuit 236, the image reading unit 238, and the image forming unit 240 to a power-saving mode (power cutoff mode).

The controller 200 and the aforementioned devices (i.e., the facsimile communication control circuit 236, the image reading unit 238, and the image forming unit 240) are supplied with power from the power device 202 (see dotted lines in FIG. 4). Although each power line is denoted by a single line (dotted line) in FIG. 4, if the polarities and the like are to be managed by the power device 202, each power line is often physically constituted of two to three wires in actuality.

Power Device 202

As shown in FIG. 4, the input power cable 244 extending from the commercial power source 242 is connected to a switch 246. By turning on the switch 246, electric power is suppliable to a first power unit 248 and to a second power unit 250 via a first sub power switch 256.

The first power unit 248 includes a control power generating section 248A that is connected to a power-supply control circuit 252 in the controller 200. The power-supply control circuit 252 supplies electric power to the controller 200. Moreover, the power-supply control circuit 252 is connected to the I/O unit 210 and performs switching control in accordance with a control program of the controller 200 so as to conduct or not to conduct electricity through at least the power supply lines extending to the aforementioned devices (i.e., the facsimile communication control circuit 236, the image reading unit 238, and the image forming unit 240).

A power line 254 connected to the second power unit 250 is provided with the first sub power switch 256 (sometimes referred to as "SW-1" hereinafter). The SW-1 is on-off controlled by the power-supply control circuit 252. Specifically, when the SW-1 is turned off, the second power unit 250 is nonfunctional (i.e., the downstream side of the SW-1 is in a zero power consumption state).

The second power unit 250 includes a 24-V power unit 250H (LVPS2) and a 5-V power unit 250L (LVPS1). The 24-V power unit 250H (LVPS2) is a power source used in a motor or the like.

The 24-V power unit 250H (LVPS2) and the 5-V power unit 250L (LVPS1) in the second power unit 250 are selectively connected to an image-reading-unit power supply section 258, an image-forming-unit power supply section 260, a facsimile-communication-control-circuit power supply section 264, and a UI-touch-screen power supply section 266.

With the 24-V power unit 250H (LVPS2) as an input source, the image-reading-unit power supply section 258 is connected to the image reading unit 238 via a second sub power switch 268 (sometimes referred to as "SW-2" hereinafter).

With the 24-V power unit 250H (LVPS2) and the 5-V power unit 250L (LVPS1) as input sources, the image-forming-unit power supply section 260 is connected to the image forming unit 240 via a third sub power switch 270 (sometimes referred to as "SW-3" hereinafter).

With the 24-V power unit 250H (LVPS2) and the 5-V power unit 250L (LVPS1) as input sources, the facsimile-communication-control-circuit power supply section 264 is connected to the facsimile communication control circuit 236 and the image forming unit 240 via a fourth sub power switch 274 (sometimes referred to as "SW-4" hereinafter).

With the 5-V power unit 250L (LVPS1) and the 24-V power unit 250H (LVPS2) as input sources, the UI-touch-screen power supply section 266 is connected to the UI touch-screen 216 (including the backlight 216BL) via a fifth sub power switch 276 (sometimes referred to as "SW-5" hereinafter). The original function of the UI touch-screen 216 (i.e., the function excluding the backlight 216BL) may be supplied with power from the monitoring control unit 24.

Similar to the first sub power switch 256, the second sub power switch 268, the third sub power switch 270, the fourth sub power switch 274, and the fifth sub power switch 276 are on-off controlled based on power-supply selection signals from the power-supply control circuit 252 in the controller 200. Although not shown, the switches and the wires through which power is supplied to the 24-V power unit 250H and the 5-V power unit 250L are constituted of dual systems. The power switches 268, 270, 274, and 276 may alternatively be disposed within the devices to be supplied with electric power instead of being disposed within the power device 202. The fixing section (not shown) (corresponding to "Fuser" shown in FIG. 3) in the image forming unit 240 is directly supplied with electric power from the commercial power source 242 (e.g., 100V) from the downstream side of the first sub power switch 256 ("SW-1") only when electric power is necessary in the image forming unit 240.

In the above configuration, electric power is supplied to the aforementioned devices (i.e., the facsimile communication control circuit 236, the image reading unit 238, and the image forming unit 240) selectively on a function-by-function basis so that power is not supplied to devices that are not used for the commanded function, whereby minimal electric power is consumed.

Monitoring Control for Mode Transition of Image Processing Apparatus

With regard to the controller 200 according to the exemplary embodiment, there is a case where the function thereof is partially stopped (i.e., partial power-saving) so that minimal electric power is consumed. There is also a case where the supply of electric power to the controller 200, including a large portion thereof, is stopped. The above cases may collectively be referred to as "sleep mode (power-saving mode)".

It is possible to change the operation mode to the sleep mode by, for example, activating the system timer upon completion of image processing. Specifically, the supply of electric power is stopped when a predetermined time elapses from a time point at which the system timer is activated. If there is any kind of an operation (such as pressing of a hard button) before the predetermined time elapses, the time-keeping process for the sleep mode is discontinued, and the system timer is activated from a time point at which subsequent image processing is completed.

Even during the sleep mode, the monitoring control unit 24 (see FIG. 4) is constantly supplied with electric power and is connected to the I/O unit 210. The monitoring control unit 24 may include, for example, an integrated-circuit (IC) chip called an application specific integrated circuit (ASIC) that stores an operation program and is equipped with a CPU, a RAM, and a ROM that are processed by the operation program.

In the monitoring process during the sleep mode, for example, there is a case where a print request is received from a communication line detector or a facsimile reception request is received from a facsimile line detector. In that case, the monitoring control unit 24 supplies electric power to the devices in the power-saving mode by controlling the first sub power switch 256, the second sub power switch 268, the third sub power switch 270, the fourth sub power switch 274, and the fifth sub power switch 276 via the power-supply control circuit 252.

The I/O unit 210 in the controller 200 is connected to a power-saving control button 26. When a user operates the power-saving control button 26 during the power-saving mode, the power-saving mode is canceled. The power-saving control button 26 may have a function that forcibly cuts off the supply of electric power to the aforementioned processing units when the button is operated while electric power is being supplied to the processing units.

In order to perform the monitoring process during the sleep mode, minimal power may be supplied to the power-saving control button 26 and the detectors in the power-saving mode, in addition to the monitoring control unit 24. Specifically, even during the sleep mode in which electric power is not supplied, there is a case where minimal electric power is received for determining whether or not a predetermined electric power or lower (e.g. 0.5 W or lower) is to be supplied. In this case, the source of electric power is not limited to the commercial power source 242 and may be, for example, a storage battery, a solar battery, or a battery charger that is charged when supplied with electric power from the commercial power source 242. By not using the commercial power source 242, commercial power consumption (i.e., electricity expense) during the sleep mode may be suppressed to zero.

In a specific period during the sleep mode, there is a case where minimal electric power is supplied to input systems, such as the UI touch-screen 216 and an IC card reader 217. In this case, the backlight 216BL may be turned off or the illuminance thereof may be set lower than that in the normal state.

Functions of Human Detection Sensors

When a user stands in front of the image processing apparatus 10 during the sleep mode and subsequently operates the power-saving control button 26 so as to resume the power supply, it may take some time for the image processing apparatus 10 to be activated.

For an "automatic recovery mode", the monitoring control unit 24 in the power-saving mode is provided with human detection sensors (i.e., a first human detection sensor 28 and a second human detection sensor 29 in the exemplary embodiment). Moreover, during the sleep mode, the human detection sensors detect the presence of a user before the user presses the power-saving cancellation button so that the power supply is quickly resumed, thereby allowing the user to use the apparatus immediately.

Although the first human detection sensor 28 and the second human detection sensor 29 are described as being "human detection" sensors, these terms are proper nouns used in the exemplary embodiment and may be of any type that can at least detect a human. In other words, these sensors may be of a type that can detect a moving body in addition to a human. Therefore, although a subject to be detected by the human detection sensors is described as being a "human" in the description below, in the future, an animal or a robot that executes a requested command in place of a human is also to be included as a subject to be detected. On the other hand, if there is a special type of sensor that can specifically detect a human, such a special type of sensor may be used. In the following description, the terms "moving body", "human", "person", "user", and the like are treated as equivalent terms as subjects to be detected by the first human detection sensor 28 and the second human detection sensor 29, and may be differentiated from one another, where appropriate.

First Human Detection Sensor 28

The first human detection sensor 28 according to the exemplary embodiment is configured to detect a movement of a moving body around (e.g. a 1-m to 5-m range around) the image processing apparatus 10. In this case, a representative example is an infrared sensor (pyroelectric sensor) that uses a pyroelectric effect of a pyroelectric element. In the exemplary embodiment, a pyroelectric sensor is used as the first human detection sensor 28.

With regard to a sensor that uses a pyroelectric effect of a pyroelectric element applied to the first human detection sensor 28, the major characteristic thereof is that the detection range (including the spreading width and the detection distance) is wide. Moreover, since the sensor detects a movement of a moving body based on a temperature change, if a person is not moving within the detection range, the sensor does not detect the presence of a person. For example, when a high-level signal is output during a movement of a person, if the person within the detection range stops moving, the signal changes to a low-level signal.

The expression "not moving" in the exemplary embodiment includes a completely still state as in a still image captured with a still camera, in addition to, for example, a state where a person stands still in front of the image processing apparatus 10 for the purpose of operating the apparatus. Therefore, the expression "not moving" includes small movements within a predetermined range (such as a movement occurring due to breathing) and movements of the hands, feet, and neck.

However, for example, if a person in front of the image processing apparatus 10 stretches at that location while waiting for an image forming process, an image reading process, or the like, the first human detection sensor 28 may sometimes detect the presence of the person.

Therefore, instead of defining the expression "not moving" and setting a threshold value for the movement detection by the first human detection sensor 28, the threshold value may be set relatively roughly to a standard value and may be dependent on the detection state of the first human detection sensor 28 based on the environment (such as the temperature and the humidity). Specifically, the threshold value may be set experimentally or statistically at a location where the apparatus is installed such that the threshold value may indicate that a person is moving if one of binary signals (e.g., a high-level signal) is output from the first human detection sensor 28 and that a person is not moving if the person is present within the detection range of the first human detection sensor 28 and the other one of the binary signals (e.g. a low-level signal) is output from the first human detection sensor 28.

The first human detection sensor 28 according to the exemplary embodiment is configured to detect a movement of a moving body around (e.g. a 0-m to 5-m range around) the image processing apparatus 10.

Second Human Detection Sensor 29

The second human detection sensor 29 according to the exemplary embodiment is configured to detect whether or not a moving body is present. A representative example of a sensor used as the second human detection sensor 29 is a reflective sensor equipped with a light emitter and a light receiver. The reflective sensor may be of a type in which the light emitter and the light receiver are separated from each other.

With regard to a reflective sensor applied to the second human detection sensor 29, the major characteristic thereof is that it reliably detects the presence of a moving body based on whether light entering the light receiver is blocked or not blocked. Furthermore, since the quantity of light entering the light receiver is limited by the quantity of light emitted from the light emitter, the reflective sensor has a relatively close detection range.

If the first human detection sensor 28 and the second human detection sensor 29 can achieve functions to be described below, the first human detection sensor 28 and the second human detection sensor 29 are not limited to a pyroelectric sensor and a reflective sensor, respectively.

In the exemplary embodiment, maximum detection ranges (e.g. a detection range F and a detection range N shown in FIG. 5) are set by the first human detection sensor 28 and the second human detection sensor 29.

Figure 5:
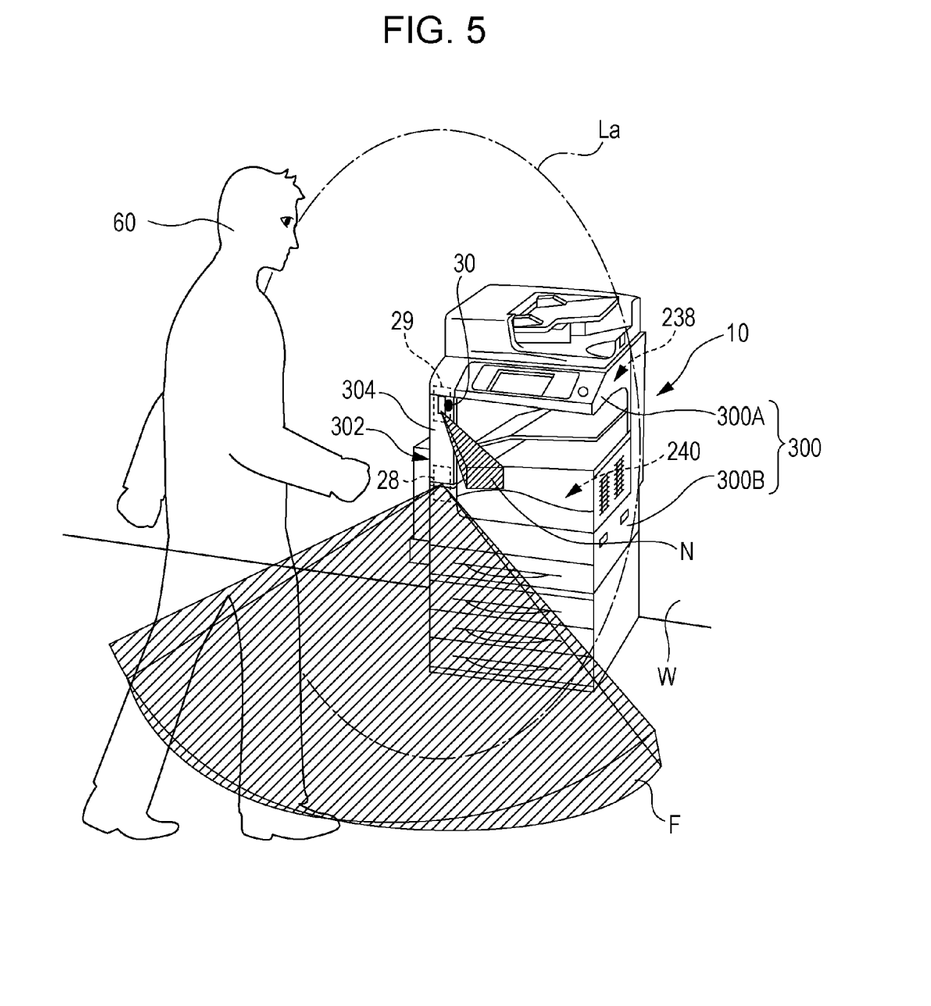
FIG. 5 is a perspective view illustrating the image processing apparatus according to the exemplary embodiment and detection ranges, in the vicinity of the apparatus, of sensors.

The detection range F in FIG. 5, which is a relatively long detection range, is a detection range by the first human detection sensor 28 and functions as a relatively-long-range moving-body detecting section. The detection range N in FIG. 5, which is a relatively close detection range, is a detection range by the second human detection sensor 29 and functions as a relatively-close-range moving-body detecting section.

Depending on the location where the image processing apparatus 10 is installed, the detection range of the first human detection sensor 28 (see the detection range F in FIG. 5) may be set such that a critical point (i.e., the farthest point) is roughly located at about 0 m to 3 m from the sensor. The detection range of the second human detection sensor 29 (see the detection range N in FIG. 5) is a range within which the UI touch-screen 216 and the hard buttons of the image processing apparatus 10 are operable and may be set such that a critical point (i.e., the farthest point) is roughly located at about 0.2 m to 1.0 m from the sensor. After both detection ranges are set, the critical point of the first human detection sensor 28 is located farther away than the critical point of the second human detection sensor 29.

In the exemplary embodiment, in addition to the first human detection sensor 28 and the second human detection sensor 29, a sensor having a camera function for detecting individual recognition information of a user is used as the third sensor 30. The third sensor 30 will be referred to as "recognition camera 30" hereinafter.

In order to detect individual recognition information of a user, the recognition camera 30 captures an image containing unique characteristic information of an individual, such as the face of the user. Based on the characteristic image information, such as the captured face image, the controller 200 performs a comparison analysis with a characteristic image database containing face images or the like preliminarily stored in the ROM 208 or the HDD 218 so as to execute, for example, individual authentication of the user or link the characteristic image information with individual unique information, and automatically display an individual user screen or the like on an operation panel. Thus, an authentication process and an individual-information searching process are reduced, so that the user is not involved with a complicated process of operating buttons, whereby a pleasant operation-less service may be provided.

The individual recognition information is used for determining whether to give the user the right to access the image processing apparatus 10, for determining the types of devices to be used, and for the operation control of the image processing apparatus 10.

For example, by preliminarily registering identification information and a job type at one's own PC 21, an authorization process is executed based on face-image information obtained after capturing an image of the user's face. By comparing identification information obtained from the face-image information with the identification information registered together with the job, a requested job type may be determined.

A subject to be image-captured by the recognition camera 30 is not limited to the user's face. Alternatively, an image of identification information, such as a bar code or a Quick Response (QR) code (registered trademark) given to an article (such as an identification (ID) card or a document) carried or brought by a user 60, may be captured and verified.

Figure 6:
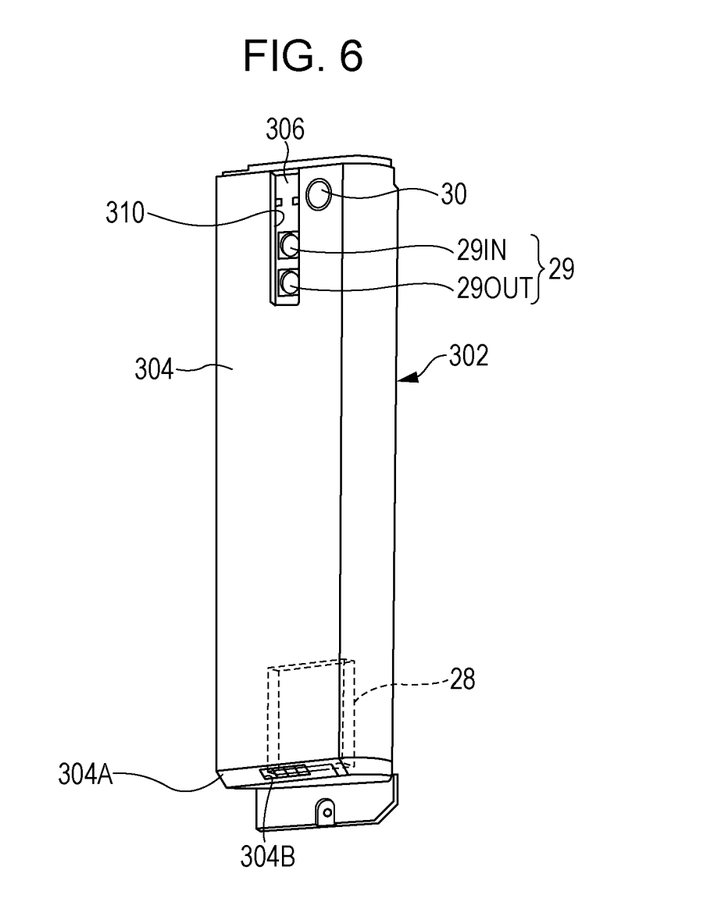
FIG. 6 is a perspective view of a cover member provided at the front surface of a pillar according to the exemplary embodiment.

First Human Detection Sensor 28, Second Human Detection Sensor 29, Recognition Camera 30, and Surrounding Structures As shown in FIG. 6, the first human detection sensor 28 and the second human detection sensor 29 are attached to a vertically-long rectangular pillar 302 of the image processing apparatus 10. As shown in FIG. 2, the pillar 302 is a part that joins an upper housing that covers the image reading unit 238 and a lower housing that covers the image forming unit 240. Inside the pillar 302, a recording-paper transport system and the like are installed.

A vertically-long rectangular cover member 304 that has a design element and covers the pillar 302 is attached to the front surface of the pillar 302.

A gap (not shown) is provided between the lower surface of the cover member 304 and the upper surface of the lower housing. As shown in FIG. 6, the lower end of the cover member 304 is beveled (beveled portion 304A) so that the opening area of the gap between the lower surface of the cover member 304 and the upper surface of the lower housing is larger than that of the gap at the far side.

The beveled portion 304A is provided with a rectangular through-hole 304B to which the first human detection sensor 28 is attached. Therefore, the through-hole 304B functions as a monitoring window through which the first human detection sensor 28 detects a moving body.

Due to being formed in the beveled portion 304A, the through-hole 304B is less noticeable from the front side of the apparatus than if the through-hole 304B is formed in the front surface, and thus does not impair the design element of the cover member 304.

As shown in FIG. 6, the upper end of the cover member 304 is provided with a vertically-long slit 310. The second human detection sensor 29 is disposed at the back side of the slit 310. The second human detection sensor 29 includes a light receiver 291N and a light emitter 29OUT as detectors that are attached to a circuit board 306.

The recognition camera 30 is disposed near the second human detection sensor 29. The optical axis of the recognition camera 30 is adjusted such that the image of the face of the user 60 approaching the image processing apparatus 10 (see FIGS. 8A to 8C) and the image of the face of the user 60 facing the UI touch-screen 216 of the image processing apparatus 10 are capturable.

The imaging timing (power supply timing) of the recognition camera 30 is controlled in conjunction with the first human detection sensor 28 and the second human detection sensor 29. Specifically, the recognition camera 30 is cut off from power supply at least during the sleep mode.

The recognition camera 30 is supplied with electric power if a moving body is detected by the first human detection sensor 28 during the sleep mode, and an imaging process of the recognition camera 30 commences before the second human detection sensor 29 detects that the user 60 is facing the UI touch-screen 216.

By analyzing the image captured by the recognition camera 30, an individual recognition process for the user 60 is executed so as to determine whether or not to allow the user 60 to use the image processing apparatus 10. This individual recognition process involves, for example, verifying the face of the user 60. In this face verification, for example, the individual recognition process of the user 60 is executed until the user 60 faces the UI touch-screen 216, and if the individual is identified, power-supply control for the devices in the image processing apparatus 10 is selectively performed.

On the other hand, for example, if the facing of the user 60 relative to the UI touch-screen 216 is not confirmed, the recognition camera 30 may sometimes be cut off from electric power based on a time period in which the facing cannot be confirmed.

The recognition camera 30 is configured to detect the presence and the shape (contour) of a moving body around the image processing apparatus 10 as well as time-series movement information, and may be, for example, an image sensor (such as a CCD image sensor or a complementary metal oxide semiconductor (CMOS) image sensor).

Although a detailed description of an image sensor will be omitted here since it is a common sensor used as a moving-image capturing unit, a simple description thereof is as follows.

An image sensor is composed of a silicon-monocrystal-based semiconductor and counts the number of freely movable electrons (signal charges) generated by a photoelectric effect so as to recognize the quantity of received light. As a mechanism for retaining the generated signal charges without letting them escape, photodiodes are commonly used.

In a case where a color image sensor is used, the colors cannot be differentiated only with the signal charge amount of the photodiodes even if the brightness can be differentiated. Therefore, color filters that transmit specific color light beams are attached to individual pixels.

For example, in an image sensor for a digital camera, the color filters are arranged in a color-and-pixel array called a Bayer array. In filters for red, green, and blue colors, which are the three primary colors of light, the green filter is used twice as much as the red and blue filters. This is because the human eye has high sensitivity to green light (i.e., green light is sensed as being the brightest even in light having the same energy). Thus, green light enhances the resolution of a captured image.

In contrast, an image sensor (such as a CCD camera) used as the recognition camera 30 according to the exemplary embodiment is not adjusted to the sensitivity of the human eye. In other words, when an image sensor is used as the recognition camera 30, the array of the color filters may be set in accordance with the content to be analyzed based on an output signal from the recognition camera 30 so as to be appropriate for each specification.

With regard to the specification of the recognition camera 30, for example, the individual recognition function thereof may verify the face of the user facing the image processing apparatus 10 instead of verifying an IC card. When a face image captured by the recognition camera 30 is recognized by being compared with the face-image database, electric power is supplied to appropriate devices (including all devices). Face recognition is performed by using a filter configuration suitable for face verification (i.e., a filter configuration that clearly detects the contour of the face, eyes, nose, mouth, and the like).

In the exemplary embodiment, information output from the recognition camera 30 is analyzed for the purpose of face recognition. Alternatively, a filter configuration that can detect an identification card that is always used and carried by each individual (including an identification card hanging from the neck or clipped to a chest pocket) in recent years or a filter configuration that can readily read identification information from, for example, a bar code or a QR code (registered trademark) given to the identification card is also permissible.

As another example, if devices to be activated are to be determined in accordance with the type of document carried by a person approaching the image processing apparatus 10, a filter configuration that can readily recognize the type of document may be used. For example, if a format of a facsimile transmission table is recognized, the devices to be used for facsimile transmission may be activated, and the display mode of the UI touch-screen 216 may be determined by recognizing whether the document is a monochrome document or a color document.

FIG. 5 illustrates an example for comparing the detection range F of the first human detection sensor 28, the detection range N of the second human detection sensor 29, and a detection range La of the recognition camera 30.

The detection range F of the first human detection sensor 28 is shown as a shaded area in FIG. 5, has a wide angle ranging between about 100° and 120°, and extends toward the floor below the image processing apparatus 10.

The detection range N of the second human detection sensor 29 is also shown as a shaded area in FIG. 5, is narrower than the detection range F of the first human detection sensor 28, and is used for detecting the user 60 facing the UI touch-screen 216.

The detection range (i.e., imaging range) La of the recognition camera 30 is denoted by a dot-dash line in FIG. 5, includes the detection range F of the first human detection sensor 28, and is used for capturing an image of the face of the user 60 approaching the UI touch-screen 216. The image of the face of the user 60 may be captured even after the user 60 is facing the UI touch-screen 216.

The operation of the exemplary embodiment will be described below.

The operation mode of the image processing apparatus 10 changes to the sleep mode when no process is performed therein. In the sleep mode, only the monitoring control unit 24 is supplied with electric power in the exemplary embodiment.

When there is an activation moment (such as when the second human detection sensor 29 predicts that a user is approaching, when the power-saving mode is canceled, or when the UI touch-screen 216 is operated (i.e., button input)), the controller 200, the UI touch-screen 216, and the recognition camera 30 are activated. In the case where the UI touch-screen 216 or the like is operated by an authorized user (i.e., button input), the operation mode changes to a warm-up mode in accordance with the job type.

When warm-up operation in the warm-up mode is completed, the operation mode of the image processing apparatus 10 changes to a standby mode or a running mode.

In the standby mode, the image processing apparatus 10 can immediately execute image processing.

Therefore, when a job execution command is input via a button, the operation mode of the image processing apparatus 10 changes to the running mode, and image processing is executed based on the job command.

When the image processing is completed (i.e., when all consecutive jobs are completed in a case where multiple consecutive jobs are on standby), the operation mode of the image processing apparatus 10 changes to the standby mode by a standby trigger.

If there is a job execution command during the standby mode, the operation mode changes to the running mode again. On the other hand, for example, if the second human detection sensor 29 detects (or predicts) that the user has moved away (or will move away) from the image processing apparatus 10 or if a predetermined time has elapsed, the operation mode changes to the sleep mode.

In the exemplary embodiment, power-supply control is performed by making the first human detection sensor 28, the second human detection sensor 29, and the recognition camera 30 work in conjunction with each other. Specifically, in contrast to the first human detection sensor 28 being constantly supplied with electric power, the second human detection sensor 29 and the recognition camera 30 are controlled based on detection information of the first human detection sensor 28 so as to be sequentially supplied with electric power, thereby establishing enhanced energy efficient properties in addition to the power-supply control for the devices.

A power-supply control routine performed by the first human detection sensor 28, the second human detection sensor 29, and the recognition camera 30 working in conjunction with each other will be described below with reference to a flowchart in FIG. 7.

Figure 7:
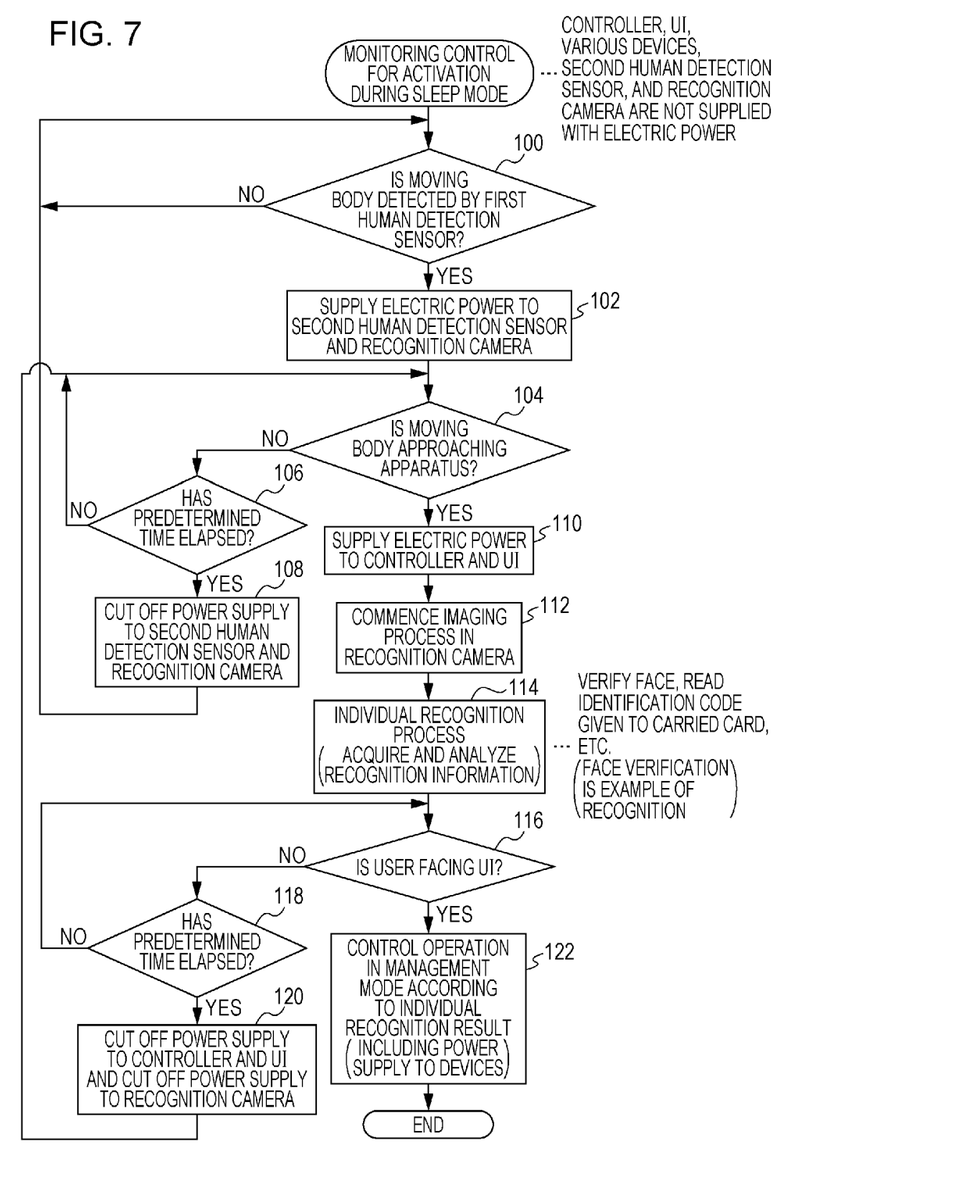
FIG. 7 is a flowchart illustrating a monitoring control routine performed when activating from a sleep mode, according to the exemplary embodiment.

Activation in FIG. 7 corresponds to when the operation mode changes to the sleep mode. During the sleep mode, the controller 200, the UI touch-screen 216, the aforementioned devices, the second human detection sensor 29, and the recognition camera 30 are not supplied with electric power (power cutoff mode). On the other hand, the monitoring control unit 24 in the controller 200 and the first human detection sensor 28 are supplied with electric power (power supply mode), and the electric power is, for example, about 0.5 W.

In step 100, it is determined whether or not a moving body is detected by the first human detection sensor 28. If a positive determination result is obtained, the process proceeds to step 102 where the second human detection sensor 29 and the recognition camera 30 are supplied with electric power. In this case, the supply of electric power to the recognition camera 30 corresponds to a so-called preparation period in which imaging is not performed.

In step 104, it is determined whether or not the moving body is approaching the image processing apparatus 10 on the basis of a detection result of the second human detection sensor 29. Specifically, if the moving body is detected by the second human detection sensor 29 after the moving body is detected by the first human detection sensor 28, it is predictable that the user 60 is approaching the image processing apparatus 10.

If a negative determination result is obtained in step 104, the process proceeds to step 106 where it is determined whether or not a predetermined time has elapsed. If a negative determination result is obtained in step 106, the process returns to step 104. The above steps are repeated until a positive determination result is obtained in step 104 or step 106.

When a positive determination result is obtained in step 106, the process proceeds to step 108 where the power supply to the second human detection sensor 29 and the recognition camera 30 is cut off. The process then returns to step 100. In this case, for example, the moving body detected by the first human detection sensor 28 is often a person who is only passing by. When a positive determination result is obtained in step 104, the process proceeds to step 110 where electric power is supplied to the controller 200 and the UI touch-screen 216.

In step 112, the recognition camera 30 commences an imaging process. Specifically, when the user 60 is detected by the second human detection sensor 29, the imaging process commences before the user 60 faces the UI touch-screen 216. Although the recognition camera 30 is supplied with electric power in step 102 when the moving body is detected by the first human detection sensor 28, the power supply timing may be delayed as much as possible based on the preparation period in which the recognition camera 30 becomes ready to capture an image. Ultimately, the imaging timing and the power supply timing may be identical.

In step 114, an individual recognition process is executed on the basis of captured image information. The individual recognition process involves analyzing a captured face image, comparing the face image with the face-image database preregistered in the ROM 208 or the HDD 218 of the controller 200, and verifying whether or not the user is authorized for using the image processing apparatus 10.

The verification is not limited to the use of a face image. Alternatively, the verification may be performed by reading identification information from, for example, a bar code or a QR code (registered trademark) given to an ID card or a document carried by the user.

In step 116, it is determined whether or not the moving body (i.e., the user 60) is facing the image processing apparatus 10. If a negative determination result is obtained in step 116, the process proceeds to step 118 where it is determined whether or not a predetermined time has elapsed. If a negative determination result is obtained in step 118, the process returns to step 116. The above steps are repeated until a positive determination result is obtained in step 116 or step 118.

When a positive determination result is obtained in step 118, the process proceeds to step 120 where the power supply to the UI touch-screen 216 and the recognition camera 30 is cut off. The process then proceeds to step 104. When a positive determination result is obtained in step 116, the process proceeds to step 122.

In step 122, the operation of the image processing apparatus 10 is controlled in a management mode in accordance with the result of the individual recognition process. Specifically, if authorization is verified, electric power is supplied to devices including the image reading unit 238 and the image forming unit 240. If authorization is not verified, notification for explaining why the verification is not possible is provided on the UI touch-screen 216.

When authorization is verified, for example, if a job is preregistered by the user 60, electric power may be supplied only to the devices to be used for the job. The electric power varies depending on the type and the number of devices to be supplied with electric power.

Figure 8A:
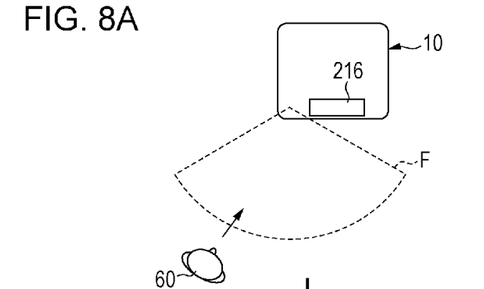
FIGS. 8A to 8C are plan views of the image processing apparatus, illustrating an operational flow based on the flowchart in FIG. 7.
Figure 8B:
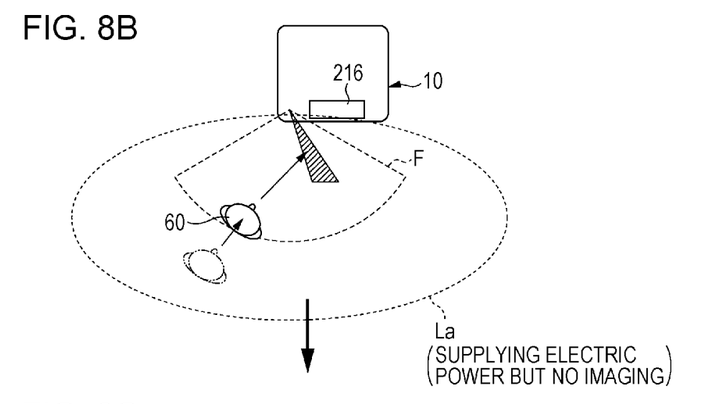
Figure 8C:
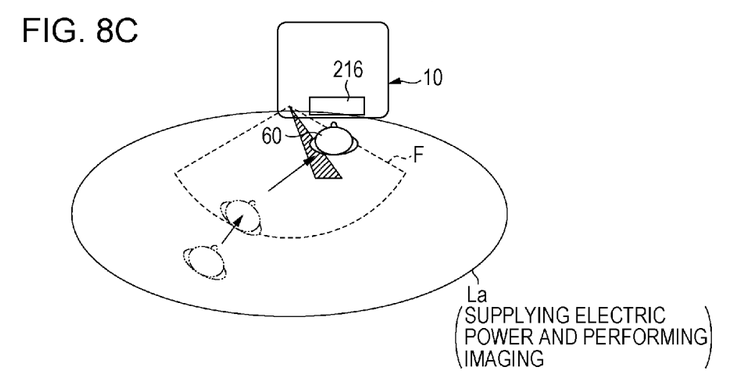

FIGS. 8A to 8C illustrate an operation pattern example based on the flowchart in FIG. 7.

In FIG. 8A, electric power is supplied only to the first human detection sensor 28, and a moving body is not detected by the first human detection sensor 28 because the user 60 is located outside the detection range F.

FIG. 8B illustrates a state where the user 60 (denoted by a solid line) has entered the detection range F of the first human detection sensor 28. At this point, a moving body is detected by the first human detection sensor 28. Therefore, the second human detection sensor 29 and the recognition camera 30 are supplied with electric power. In this state, the second human detection sensor 29 is capable of detecting that the user 60 is approaching the image processing apparatus 10. Furthermore, the recognition camera 30 commences an imaging process so that an individual recognition process is executed.

FIG. 8C illustrates a state where the user 60 (denoted by a solid line) is facing the UI touch-screen 216. At this point, the individual recognition process in the recognition camera 30 is completed, and the devices are supplied with electric power in a management mode in accordance with the verification result.

The operation pattern shown in FIGS. 8A to 8C is only an example. The power-supply control performed based on the first human detection sensor 28, the second human detection sensor 29, and the recognition camera 30 working in conjunction with each other in the exemplary embodiment is not limited to the operation pattern shown in FIGS. 8A to 8C and is applicable to movements of various moving bodies. Furthermore, the power-supply control is also applicable to a case where a so-called passing moving body is present in an area surrounding the user shown in FIGS. 8A to 8C or a case where multiple users simultaneously approach the image processing apparatus 10.

An image processing apparatus according to the exemplary embodiment includes a power-supply controller, a moving-body detector, a user determination unit, an individual recognition unit, and a commanding unit. The power-supply controller changes an operation mode of each of controlled subjects to a power supply mode or a power cutoff mode. Each controlled subject includes a processing unit that executes specific processing by being supplied with electric power, an interface having a function for receiving operation command information for the processing unit and a function for providing notification of operation mode information of the processing unit, a management controller that manages operation of the processing unit and operation of the interface in conjunction with each other. The moving-body detector is continuously supplied with electric power by the power-supply controller even when all of the controlled subjects are in the power cutoff mode and detects a movement of a moving body within a predetermined detection range. The moving body includes a user who uses the processing units. The user determination unit belongs to the controlled subjects, is supplied with electric power when the moving-body detector detects that the moving body has entered the detection range, and at least determines whether or not the moving body is a user facing the interface. The individual recognition unit includes an imaging element that is supplied with electric power when the user determination unit determines that the moving body is the user and that captures a characteristic image of the user. Based on image information of the characteristic image captured by the imaging element, the individual recognition unit executes an individual recognition process of the user. When the user determination unit determines that the moving body is the user, the commanding unit outputs a power-supply-mode command to the power-supply controller and outputs a management-control-mode command to the management controller based on an individual recognition result obtained by the individual recognition unit.

Although the image processing apparatus 10 is described as being a subject to be controlled for power supply in the exemplary embodiment, the subject is not limited to the image processing apparatus 10. Alternatively, the subject is applicable to a processing apparatus in which power-supply control is executed based on the type of moving body (user/non-user), a movement prediction of a moving body, and the movement history. Examples of such a processing apparatus include an automatic vending machine, a building security system, a ticket vending machine, and an automatic ticket gate.

In this case, a human determination device having a monitoring unit that monitors the moving body, an imaging unit that is supplied with electric power when approaching of the moving body is determined by the monitoring unit and that captures a characteristic image of the moving body, and an individual recognition unit that performs an individual recognition process based on image information of the characteristic image captured by the imaging unit may be provided.

In the exemplary embodiment, the term "face verification" is considered as one result of "face recognition". Specifically, the term "face recognition" is not limited to "face verification" and may include, for example, a service that recognizes a facial expression (such as a smile or a wink) and displays a message appropriate for the facial expression in an image displayed on the UI touch-screen 216. In face recognition, words may be analyzed by recognizing lip movements.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power-supply control device comprising:
   a changing unit configured to change an operation mode of a controlled subject to a power supply mode or a power cutoff mode, wherein the controlled subject includes a processing unit configured to execute processing by being supplied with electric power, an interface configured to receive operation command information for the processing unit and configured to provide notification of operation mode information of the processing unit, and a controller configured to control operation of each of the processing unit and the interface;
   a monitoring unit configured to monitor a movement of a moving body during the power cutoff mode;
   a commanding unit configured to output a first command for changing the operation mode of the interface and the controller to the power supply mode if the monitoring unit determines that the moving body is approaching the controlled subject;
   an imaging unit configured to be supplied with electric power in response to the approaching of the moving body and configured to capture a characteristic image of the moving body;
   an individual recognition unit configured to execute an individual recognition process based on image information of the characteristic image captured by the imaging unit; and
   a determination unit configured to determine whether to output a second command for selectively changing the operation mode of the processing unit to the power supply mode based on a result of the individual recognition process.

2. The power-supply control device according to claim 1, wherein the individual recognition unit is configured to complete the individual recognition process at least before the moving body operates the interface.

3. The power-supply control device according to claim 1, wherein the monitoring unit includes at least one of a pyroelectric detector, a two-dimensional-array heat-source detector, and a reflective detector, the pyroelectric detector configured to at least detect the movement of the moving body within a detection range, the two-dimensional-array heat-source detector having a multi-pixel array by arranging a plurality of heat-source detectors in longitudinal and lateral directions, each heat-source detector configured to output an electric signal in accordance with an amount of heat received from a heat source, the reflective detector configured to detect presence of the moving body within the detection range.

4. An image processing apparatus comprising:
   the power-supply control device according to claim 1; and
   the controlled subject, wherein the processing unit includes at least one of an image reading unit configured to read an image from a document image, an image forming unit configured to form an image on recording paper based on image information, and a facsimile communication controller configured to exchange an image with a destination under a predetermined communication procedure set between the facsimile communication controller and the destination.

5. A non-transitory computer readable medium storing a program causing a computer to execute a process for controlling power supply, the process comprising:
   monitoring a movement of a moving body when a controlled subject whose operation mode is configurable to be changed to a power supply mode or a power cutoff mode is in the power cutoff mode, wherein the controlled subject includes a processing unit configured to execute processing by being supplied with electric power, an interface configured to receive operation command information for the processing unit and configured to provide notification of operation mode information of the processing unit, and a controller configured to control operation of each of the processing unit and the interface;
   outputting a first command for selectively changing the operation mode of the interface and the controller to the power supply mode if a result of the monitoring indicates that the moving body is approaching the controlled subject;
   capturing a characteristic image of the moving body by using an imaging element that is supplied with electric power in response to the approaching of the moving body;
   executing an individual recognition process based on image information of the captured characteristic image; and
   determining whether to output a second command for selectively changing the operation mode of the processing unit to the power supply mode based on a result of the individual recognition process.

6. A power-supply control method comprising:
- monitoring a movement of a moving body when a controlled subject whose operation mode is configurable to be changed to a power supply mode or a power cutoff mode is in the power cutoff mode, wherein the controlled subject includes a processing unit configured to execute processing by being supplied with electric power, an interface configured to receive operation command information for the processing unit and configured to provide notification of operation mode information of the processing unit, and a controller configured to control operation of each of the processing unit and the interface;
- outputting a first command for selectively changing the operation mode of the interface and the controller to the power supply mode if a result of the monitoring indicates that the moving body is approaching the controlled subject;
- capturing a characteristic image of the moving body by using an imaging element that is supplied with electric power in response to the approaching of the moving body;
- executing an individual recognition process based on image information of the captured characteristic image; and
- determining whether to output a second command for selectively changing the operation mode of the processing unit to the power supply mode based on a result of the individual recognition process.

* * * * *